US011634116B2

(12) United States Patent
Sasaki et al.

(10) Patent No.: US 11,634,116 B2
(45) Date of Patent: Apr. 25, 2023

(54) CONTROL SYSTEM FOR VEHICLE (71) Applicant: TOYOTA JIDOSHA KABUSHIKI KAISHA, Toyota (JP)

(72) Inventors: Keisuke Sasaki, Susono (JP); Akira Eiraku, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/172,205

(22) Filed: Feb. 10, 2021

(65) Prior Publication Data
US 2021/0261114 A1   Aug. 26, 2021

(30) Foreign Application Priority Data

Feb. 21, 2020   (JP) .............................. JP2020-028537

(51) Int. Cl.
*B60W 10/08* (2006.01)
*B60W 20/15* (2016.01)
*B60W 20/40* (2016.01)
*B60W 10/06* (2006.01)
*B60W 30/19* (2012.01)

(52) U.S. Cl.
CPC ............ *B60W 20/15* (2016.01); *B60W 10/06* (2013.01); *B60W 10/08* (2013.01); *B60W 20/40* (2013.01); *B60W 30/19* (2013.01); *B60W 2510/0638* (2013.01); *B60W 2510/0657* (2013.01); *B60W 2510/0685* (2013.01); *B60W 2510/083* (2013.01); *B60W 2510/1025* (2013.01); *B60W 2710/0666* (2013.01); *B60W 2710/083* (2013.01)

(58) Field of Classification Search
CPC ................. B60W 20/15; B60W 20/40; B60W 2510/083; B60W 2510/0638; B60W 10/08; B60W 10/02; B60W 50/06; B60W 2710/0644; B60W 2710/0666; B60W 2710/083; B60W 10/06; B60W 20/10; B60W 2510/0685; B60W 30/19
USPC ......................................................... 477/3, 5
See application file for complete search history.

(56) References Cited

U.S. PATENT DOCUMENTS

2009/0093940 A1* 4/2009 Ichimoto ................ B60K 6/445
701/102
2012/0232732 A1   9/2012 Tsuda et al.
(Continued)

FOREIGN PATENT DOCUMENTS

CN   107745712 A  *  3/2018   .......... B60W 30/143
JP   H6-233411 A      8/1994
(Continued)

*Primary Examiner* — Roger L Pang
(74) *Attorney, Agent, or Firm* — Oliff PLC (57) ABSTRACT

A control system for a vehicle that executes a feedback control properly to adjust a speed of a predetermined rotary member to a target speed. A controller is configured to: calculate an amount of change in a torque applied to the rotary member by one of the torque devices, in accordance with operating conditions of the torque devices; and calculate an amount of change in the torque applied to the rotary member by another one of the torque devices, based on a target amount of change in a synthesized torque of the torques of the torque devices and the amount of change in the torque applied to the rotary member by one of the torque devices.

8 Claims, 5 Drawing Sheets (56) References Cited

U.S. PATENT DOCUMENTS

| | | | | |
|---|---|---|---|---|
| 2013/0030625 A1* | 1/2013 | Park | ................ | B60W 20/40 |
| | | | | 903/905 |
| 2013/0325238 A1 | 12/2013 | Kato et al. | | |
| 2015/0126329 A1 | 5/2015 | Johri et al. | | |
| 2017/0356414 A1* | 12/2017 | Johri | ................ | B60W 10/08 |
| 2021/0370909 A1* | 12/2021 | Kim | ................ | B60W 20/10 |

FOREIGN PATENT DOCUMENTS

| | | |
|---|---|---|
| JP | 2011-194941 A | 10/2011 |
| JP | 2012-189119 A | 10/2012 |
| JP | 2013-189034 A | 9/2013 |
| WO | 2012/114440 A1 | 8/2012 |

* cited by examiner

IN A CASE OF OPERATING ENGINE AT LOW SPEED

MOTOR TORQUE CONTROL ⇨ IGNITION CONTROL ⇨ FUEL INJECTION CONTROL ⇨ AIR INTAKE CONTROL

FIG. 4B

IN A CASE OF OPERATING ENGINE AT HIGH SPEED

IGNITION CONTROL ⇨ FUEL INJECTION CONTROL ⇨ MOTOR TORQUE CONTROL ⇨ AIR INTAKE CONTROL

FIG. 5

CONTROL SYSTEM FOR VEHICLE

CROSS-REFERENCE TO RELATED APPLICATIONS

The present disclosure claims the benefit of Japanese Patent Application No. 2020-028537 filed on Feb. 21, 2020 with the Japanese Patent Office.

BACKGROUND

Field of the Invention

Embodiments of the present disclosure relate to the art of a control system for a vehicle having a plurality of torque devices connected to a predetermined rotary member, that is configured to adjust a rotational speed of the rotary member to a target speed by controlling torques of the torque devices.

Discussion of the Related Art

JP-A-H06-233411 describes a controller for a hybrid vehicle. According to the teachings of JP-A-H06-233411, a synthesized torque of an engine torque and a motor torque is controlled by a feedback method. In order not to increase emission when the engine torque is changed, the controller taught by JP-A-H06-233411 sets a feedback gain of the engine torque to a value smaller than a feedback gain of the motor torque.

JP-A-2013-189034 describes a hybrid vehicle in which an engine, a motor, and an output member are connected to one another while being allowed to rotate differentially. A control device described in JP-A-2013-189034 is configured to adjust an engine speed to a target speed by controlling a motor speed. In general, a response of the engine is slower than a response of the motor, therefore, an engine torque and a motor torque may not be controlled in a uniformed manner. For this reason, when temporarily changing the engine speed, the control device taught by JP-A-2013-189034 maintains a target engine speed for controlling the engine torque before changing the engine speed, and changes a target motor speed for controlling the motor torque in accordance with a change in the target engine speed to change the actual engine speed.

JP-A-2011-194941 describes a controller for a hybrid vehicle having an engine, a clutch connected to an output shaft of the engine, and a motor connected to the engine through the clutch. Since a reaction torque established by a torque converter is changed non-linearly, in the hybrid vehicle of this kind, a speed of the motor may not be controlled accurately. According to the teachings of JP-A-2011-194941, therefore, the controller controls a motor torque by a feedback method based on a difference between an actual value and a target value of an input speed to the torque converter, and set a feedback gain based on an allowable change in the motor speed and a motion characteristic of the torque converter.

As described, in order to prevent an increase in the emission resulting from a change in the engine torque, the controller taught by JP-A-H06-233411 is configured to set a feedback gain of the engine torque to a smaller value, and to set a feedback gain of the motor torque to a greater value. However, if the motor torque has been increased or decreased close to limit values before executing the feedback control, an available change in the motor torque is rather small. In this case, therefore, a required torque may not be achieved by the synthesized torque of the engine torque and the motor torque.

As also described, the controller taught by JP-A-2013-189034 is designed on the assumption that the response of the motor torque is faster than the response of the engine torque. Specifically, when temporarily changing the engine speed, the control device taught by JP-A-2013-189034 does not change the target engine speed to control the engine torque, and changes the target motor speed to control the motor torque to the engine sped changed temporarily. However, if the motor speed is high, a change rate of the motor torque may be restricted to prevent an excessive rise in a temperature of an inverter for controlling the motor. In this case, the response of the motor torque may become slower. By contrast, in a case of controlling the engine torque by altering an ignition timing to ignite an air/fuel mixture, the response of the engine torque becomes faster with an increase in the engine speed. That is, when both of the engine and the motor are operated at high speeds, the response of the engine torque may be faster than the response of the motor torque. Therefore, if the motor torque is controlled irrespective of operating conditions of the engine and the motor, the synthesized torque of the engine torque and the motor torque may not be changed promptly.

SUMMARY

Aspects of embodiments of the present disclosure have been conceived noting the foregoing technical problems, and it is therefore an object of the present disclosure to provide a control system for a vehicle that executes a feedback control properly to adjust a speed of a predetermined rotary member to a target speed.

The control system according to the exemplary embodiment of the present disclosure is applied to a vehicle having at least two torque devices each of which applies a torque to a predetermined rotary member. In order to achieve the above-explained objective, according to the exemplary embodiment of the present disclosure, the control system is provided with a controller that controls a synthesized torque of the torques generated by the torque devices to adjust a speed of the predetermined rotary member to a target speed. Specifically, the controller is configured to: calculate a target amount of change in the synthesized torque required to reduce a difference between an actual speed and the target speed of the predetermined rotary member; calculate an amount of change in the torque applied to the predetermined rotary member by one of the torque devices, in accordance with operating conditions of the torque devices when reducing the difference between the actual speed and the target speed of the predetermined rotary member; and calculate an amount of change in the torque applied to the predetermined rotary member by another one of the torque devices, based on the target amount of change in the synthesized torque and the amount of change in the torque applied to the predetermined rotary member by said one of the torque devices.

In a non-limiting embodiment, the vehicle may further comprise an engine and a motor connected to the predetermined rotary member respectively to apply the torque to the predetermined rotary member, and the torque devices may include the engine and the motor. The controller may be further configured to: select the motor as said one of the torque devices and select the engine as said another one of the torque devices, if a response of the torque of the motor is faster than a response of the torque of the engine; and select the engine as said one of the torque devices and select the motor as said another one of the torque devices, if the response of the torque of the engine is faster than the response of the torque of the motor.

In a non-limiting embodiment, the controller may be further configured to: determine that the response of the torque of the motor is faster than the response of the torque of the engine if a speed of the engine is lower than a predetermined level; and determine that the response of the torque of the engine is faster than the response of the torque of the motor if the speed of the engine is equal to or higher than the predetermined level.

In a non-limiting embodiment, the controller may be further configured to: control an ignition timing of the engine to ignite an air/fuel mixture supplied to the engine in accordance with a rotational angle of an output shaft of the engine; and change the torque applied to the predetermined rotary member by changing the ignition timing of the engine from a predetermined timing.

In a non-limiting embodiment, the controller may be further configured to: supply a fuel to the engine in accordance with a rotational angle of an output shaft of the engine; and change the torque applied to the predetermined rotary member in accordance with an amount of fuel supply to the engine.

In a non-limiting embodiment, the controller may be further configured to select the torque device in which a changeable amount of the torque thereof is greater as said one of the torque devices.

In a non-limiting embodiment, the vehicle may further comprise: a prime mover connected to the predetermined rotary member to apply the torque to the predetermined rotary member; and an engagement device that changes a torque transmitting capacity between the predetermined rotary member and another rotary member. The torque devices may include the prime mover and the engagement device. The controller may be further configured to: select the engagement device as said one of the torque devices if a power required to be generated by the prime mover is equal to or greater than a predetermined value; and select the prime mover as said one of the torque devices if the power required to be generated by the prime mover is less than the predetermined value.

Thus, according to the exemplary embodiment of the present disclosure, at least two torque devices apply the torque to the predetermined rotary member. In the vehicle to which the control system is applied, therefore, a rotational speed of the predetermined rotary member can be changed by controlling the torque of at least one of the torque devices. As described, the controller is configured to set the amount of change in the torque applied to the predetermined rotary member by one of the torque devices, in accordance with operating conditions of the torque devices when reducing the difference between the actual speed and the target speed of the predetermined rotary member. In other words, the torque device to generate a feedback torque for controlling the speed of the predetermined rotary member preferentially is selected depending on operating conditions of the torque devices. According to the exemplary embodiment of the present disclosure, therefore, the torque device that is more suitable to generate the feedback torque may be selected properly. For this reason, a feedback control to adjust the actual rotational speed of the predetermined rotary member to the target speed may be executed properly.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
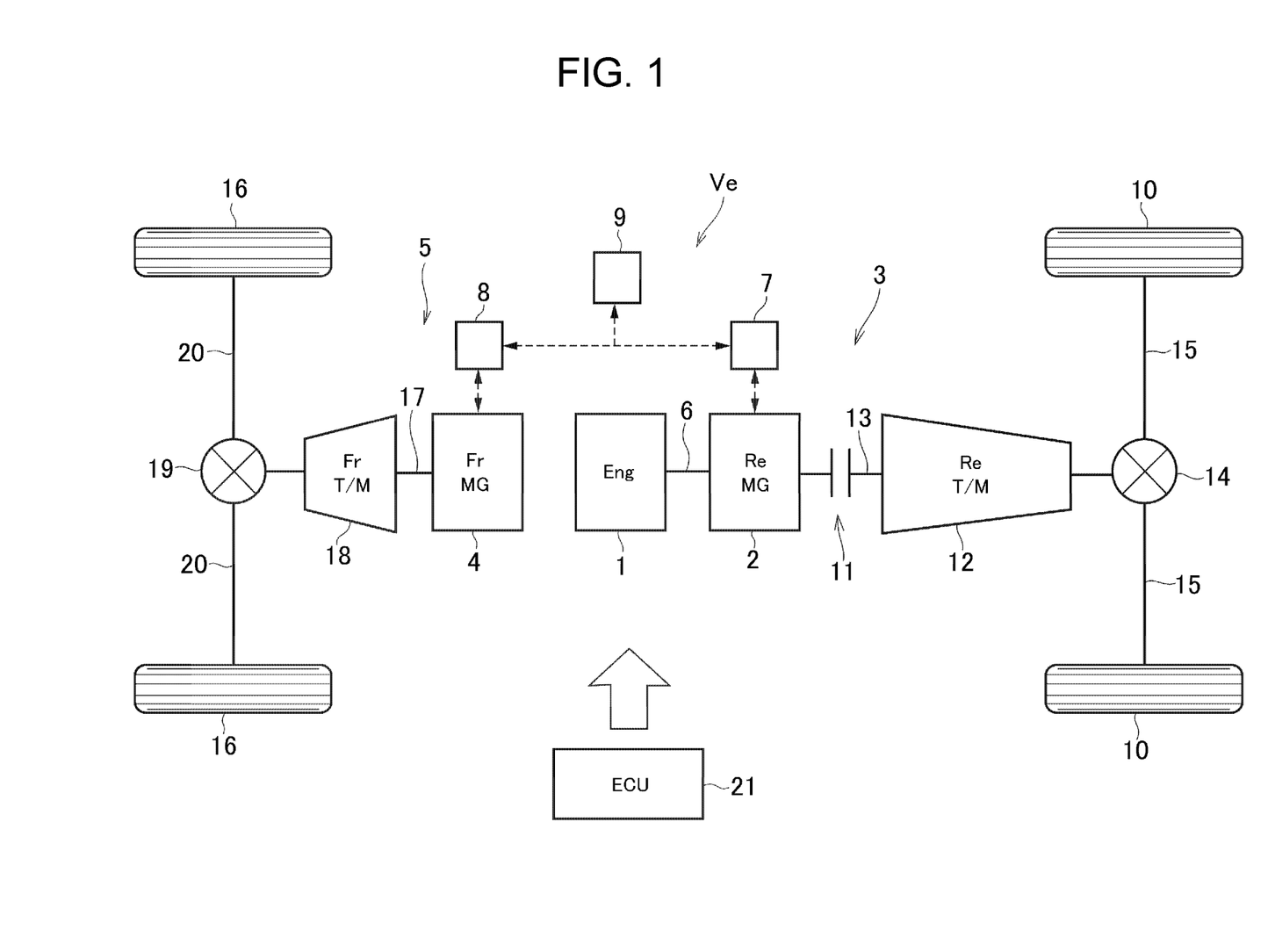
FIG. 1 is a schematic illustration showing a structure of a vehicle to which the control system according to the exemplary embodiment of the present disclosure is applied.

An exemplary embodiment of the present disclosure will now be explained with reference to the accompanying drawings. Referring now to FIG. 1, there is shown one example of a structure of a vehicle Ve to which the control system according to the embodiment of the present disclosure is applied. The vehicle Ve shown in FIG. 1 is a four-wheel drive layout hybrid vehicle in which a prime mover comprises: a rear drive unit 3 including an engine (referred to as "Eng" in FIG. 1) 1, and a rear motor (referred to as "Re-MG" in FIG. 1) 2; and a front drive unit 5 including a front motor (referred to as "Fr-MG" in FIG. 1) 4.

For example, a gasoline engine and a diesel engine may be adopted as the engine 1, and an output torque of the engine 1 is changed by controlling an intake air, a fuel injection, and an ignition timing. When the engine 1 is rotated passively while stopping a fuel supply thereto, a brake force derived from a friction torque and a pumping loss is applied to an output shaft 6 of the engine 1. That is, a fuel-cut control may be executed. In the following explanations, the torque generated by the engine 1 will be referred to as the engine torque.

The engine torque may be reduced by retarding an ignition timing of the engine 1 from a best ignition timing (i.e., minimum advance for the best torque) as a "predetermined timing" of the embodiment, by reducing or stopping a fuel injection, or reducing an air intake (or closing a throttle valve). By contrast, the engine torque may be increased by setting the ignition timing of the engine 1 to the best ignition timing. If the ignition timing cannot be set to the best ignition timing for some reason, the engine torque may be increased by advancing the ignition timing of the engine 1 from the best ignition timing by increasing the fuel injection, or increasing the air intake.

In order to change the engine torque, the ignition timing of the engine 1 and the fuel injection to the engine 1 are controlled in accordance with a speed of the engine 1 (hereinafter referred to as the engine speed), specifically, in accordance with a rotational angle (i.e., a crank angle) of the output shaft 6 serving as a crankshaft of the engine 1. That is, a change rate of the engine torque becomes faster with an increase in the engine speed. In other words, a response of the engine torque becomes faster. By contrast, in the case of changing the engine torque by changing an opening degree of throttle valve, the air intake is changed irrespective of the engine speed. If the engine 1 is provided with a supercharger, the engine torque may also be changed by activating or stopping the supercharger to change the air intake. In this case, the air intake is also changed irrespective of the engine speed. In those cases, therefore, the change rate of the engine torque becomes slower than that of the case of changing the engine torque by changing the ignition timing or the fuel injection. In other words, the response of the engine torque becomes slower.

For example, an AC motor such as a synchronous motor in which a rotor is provided with a permanent magnet may be adopted as the rear motor 2 and the front motor 4, respectively. That is, each of the rear motor 2 and the front motor 4 may serve not only as a motor to generate a torque to increase a rotational speed of an output shaft thereof, but also as a generator to partially translate a power of the output shaft thereof into an electric power by generating a torque in a direction of reducing a speed of the output shaft.

The rear motor 2 is connected to an inverter 7 and the front motor 4 is connected to an inverter 8, and the inverters 7 and 8 are connected to an electric storage device 9, respectively. Each of the inverters 7 and 8 is provided individually with a switch element in which a diode and a transistor are connected in parallel. That is, a current value and a frequency of the current supplied to the rear motor 2 is controlled by the inverter 7 in accordance with an incident signal to the switch element of the inverter 7, and a current value and a frequency of the current supplied to the front motor 4 is controlled by the inverter 8 in accordance with an incident signal to the switch element of the inverter 8. In addition, the inverter 7 and the inverter 8 are connected to each other so that electric power may be exchanged between the inverter 7 and the inverter 8.

The torque distributed to a pair of rear wheels 10 is controlled by the rear drive unit 3. In the rear drive unit 3, a rotor of the rear motor 2 is fitted onto the output shaft 6 of the engine 1 through e.g., a spline so that a torque of the rear motor 2 is added to the output shaft 6. Instead, the rear motor 2 may also be connected to the engine 1 through a gear pair, a torque converter, a clutch device or the like.

The output shaft 6 of the engine 1 as a predetermined rotary member further extends from the rear motor 2 to a rear section of the vehicle Ve, and a leading end of the output shaft 6 is connected to a clutch device 11. For example, a dog clutch and a friction clutch may be adopted as the clutch device 11, and a torque transmission between the rear motor 2 and a rear transmission (referred to as "Re T/M" in FIG. 1) 12 is interrupted by disengaging the clutch device 11.

Specifically, the rear transmission 12 is connected to an output shaft 13 of the clutch device 11 so that rotational speeds of the engine 1 and the rear motor 2 are changed by the rear transmission 12. For example, a geared transmission having a plurality of engagement devices and a continuously variable transmission may be adopted as the rear transmission 12. In a case of employing the geared transmission as the rear transmission 12, a gear stage of the rear transmission 12 is shifted among a plurality of stages by manipulating the engagement devices. By contrast, in a case of using the continuously variable transmission as the rear transmission 12, a speed ratio of the rear transmission 12 may be varied continuously. The rear transmission 12 is connected to the rear wheels 10 through a rear differential gear unit 14 and rear driveshafts 15.

The output torque of the engine 1 (i.e., the engine torque) and the output torque of the rear motor 2 (hereinafter referred to as the motor torque) are delivered to the rear transmission 12, and further delivered to the rear wheels 10 while being changed in accordance with a speed ratio set by the rear transmission 12. In the rear drive unit 3, therefore, the torque delivered to the rear transmission 12 and the rear wheels 10 may be changed by changing any one of the engine torque and the motor torque.

The engine torque is controlled based on the engine speed in such a manner as to adjust an operating point of the engine 1 to a most fuel efficient point. On the other hand, the motor torque may be set to a torque corresponding to a difference between a target input torque to the rear transmission 12 and the engine torque. Specifically, the target input torque to the rear transmission 12 may be calculated based on a required drive force to propel the vehicle Ve and a speed ratio of the rear transmission 12. That is, if the target input torque to the rear transmission 12 is greater than the engine torque, the rear motor 2 generates a torque to achieve the target input torque. By contrast, if the target input torque to the rear transmission 12 is less than the engine torque, the rear motor 2 generates a brake torque to cancel an excess torque.

On the other hand, the torque distributed to a pair of front wheels 16 is controlled by the front drive unit 5. In the front drive unit 5, an output shaft 17 of the front motor 4 is connected to a front transmission (referred to as "Fr T/M" in FIG. 1) 18. For example, a geared transmission and a continuously variable transmission may also be adopted as the front transmission 18. The front transmission 18 is connected to the front wheels 16 through a front differential gear unit 19 and front driveshafts 20.

The engine 1, the rear motor 2, the front motor 4, the inverter 7, the inverter 8, the rear transmission 12, the front transmission 18, the clutch device 11 and so on are controlled by an electronic control unit (to be abbreviated as the "ECU" hereinafter) 21 as a controller. The ECU 21 comprises a microcomputer as its main constituent that is configured to preform calculation based on incident data transmitted from sensors arranged in the vehicle Ve, and formulas, maps control flows etc. installed in advance. Calculation results are transmitted from the ECU 21 to the devices controlled by the ECU 21 in the form of command signal.

For example, the ECU 21 receives data about: a speed of the vehicle Ve detected by a vehicle speed sensor; a crank angle of the engine 1 detected by an angle sensor; a speed of the rear motor 2 detected by a motor speed sensor; a speed of the front motor 4 detected by another motor speed sensor; a position of an accelerator pedal (not shown) detected by an accelerator sensor; and a state of charge (to be abbreviated as "SOC" hereinafter) level of the electric storage device 9 detected by a battery sensor (neither of the sensors are shown). A speed of the engine 1 may be calculated by multiplying the detected crank angle of the engine 1 by a predetermined coefficient.

The maps installed in the ECU 21 include: a map determining a required drive force to propel the vehicle Ve based on a position of the accelerator pedal and a speed of the vehicle Ve; and maps determining speed ratios of the rear transmission 12 and the front transmission 18 based on a position of the accelerator pedal and a required drive force. For example, the control flow installed in the ECU 21 is configured to control output torques and speeds of the engine 1, the rear motor 2, and the front motor 4 during a transient state of speed change operations of the rear transmission 12 and the front transmission 18 executed with reference to a shift map.

An operating mode of the vehicle Ve may be selected from: an engine mode in which the vehicle Ve is propelled by delivering the engine torque to the rear wheels 10; and an electric vehicle mode (to be abbreviated as the EV mode hereinafter) in which the vehicle Ve is propelled by delivering the output torque of the front motor 4 to the front wheels 16 while interrupting a torque transmission between the engine 1 and the rear wheels 10. During propulsion in the engine mode, the motor torque may be added to the engine torque, and an output power of the engine 1 may be translated partially into an electric power by the rear motor 2. In addition, during propulsion in the engine mode, the output torque of the front motor 4 may also be delivered to the front wheels 16 to generate a drive force.

In the EV mode, the clutch device 11 is disengaged. For example, in the EV mode, the output power of the engine 1 may be translated into the electric power by the rear motor 2, and the vehicle Ve may be propelled by supplying the electric power translated by the rear motor 2 to the front motor 4. Instead, in the EV mode, the vehicle Ve may also be propelled by supplying the electric power to the front motor 4 from the electric storage device 9.

When a required drive force or a vehicle speed is changed during propulsion in the engine mode, a speed ratio of the rear transmission 12 is changed to operate the engine 1 at an optimally fuel efficient point. Specifically, when changing the speed ratio of the rear transmission 12, the clutch device 11 is disengaged to interrupt torque transmission between the rear motor 2 and the rear transmission 12, and then the speed ratio of the rear transmission 12 is changed. As a result, a rotational speed of the output shaft 13 of the clutch device 11 is changed based on the speed ratio of the rear transmission 12 thus changed and the vehicle speed after the speed change operation of the of the rear transmission 12.

When engaging the clutch device 11 again after the speed change operation of the rear transmission 12, a difference between an input speed to the clutch device 11 and an output speed from the clutch device 11 has to be reduced. To this end, the input speed to the clutch device 11 is synchronized with the output speed from the clutch device 11 to be changed by the speed change operation of the rear transmission 12, during or after the speed change operation of the rear transmission 12. The input speed to the clutch device 11, that is, a rotational speed of the output shaft 6 of the engine 1 may be changed by controlling the torque of at least one of the engine 1 and the rear motor 2 that applies the torque to the output shaft 6. A torque required to change the rotational speed of the output shaft 6 may be calculated by multiplying: a total inertia moment of rotary members connected to the output shaft 6 established by disengaging the clutch device 11; by a required change rate of the rotational speed of the output shaft 6 to be changed. Accordingly, the engine 1 and the rear motor 2 serve as a "torque device" of the embodiment of the present disclosure.

During propulsion in the EV mode, the engine 1 and the rear motor 2 may be stopped. Otherwise, the engine 1 and the rear motor 2 may also be activated to translate a power generated by the engine 1 into an electric power by the rear motor 2. In this case, however, the rotational speeds of the engine 1 and the rear motor 2 are not always the same as the output speed from the clutch device 11. Therefore, when it is required to shift the operating mode from the EV mode to the engine mode, at least one of the engine torque and the motor torque is controlled so as to synchronize the input speed to the clutch device 11 with the output speed from the clutch device 11, as the case of executing the speed change operation of the rear transmission 12.

Figure 2:
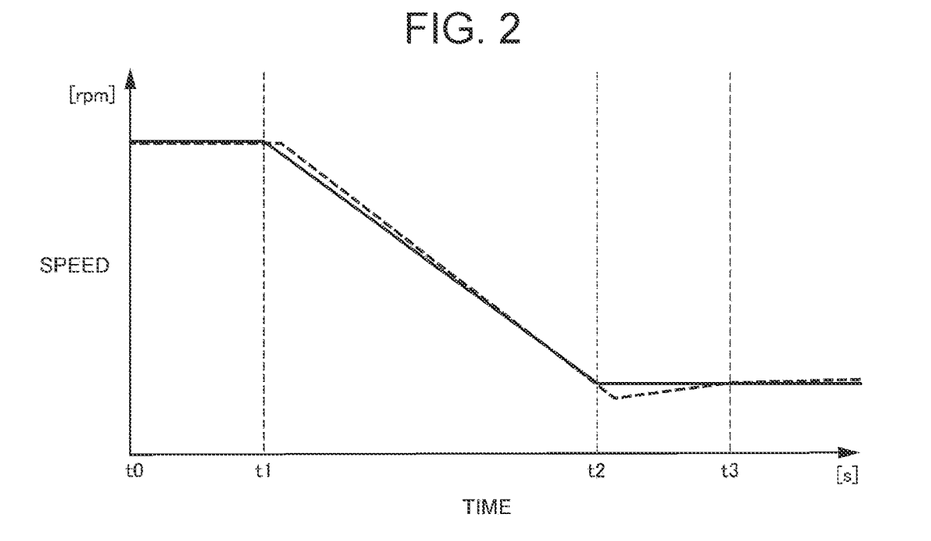
FIG. 2 is a time chart showing temporal changes in an actual speed of the engine and a target speed of the engine during execution of an upshifting.

Turning to FIG. 2, there are shown temporal changes in a target speed and an actual speed of the output shaft 6, in a case that the output speed from the clutch device 11 is reduced as a result of executing an upshifting of the rear transmission 12, and the rotational speed of the output shaft 6 of the engine 1 is reduced in response to such reduction in the output speed from the clutch device 11. In the vehicle Ve shown in FIG. 1, the rotational speed of the output shaft 6 of the engine 1 is the same as the input speed to the clutch device 11. Therefore, in the following explanations, the rotational speed of the output shaft 6 will also be simply called the input speed, and the output speed of the clutch device 11 will also be simply called the output speed.

In FIG. 2, the solid curve represents a target value of the input speed to the clutch device 11, and the dashed curve represents an actual value of the input speed to the clutch device 11. At point t0 before executing the upshifting of the rear transmission 12, the target input speed and the actual input speed are equal to each other at a relatively high speed. In order to reduce the input speed to the clutch device 11 to the output speed from the clutch device 11 to be reduced by the upshifting, the target input speed starts decreasing gradually from point t1. Consequently, the actual input speed starts decreasing almost at the same time. That is, one of the engine torque and the motor torque is reduced by a feedback method such as a PID method employing a difference between the target input speed to the actual input speed, so as to reduce the actual input speed. In this situation, a synthesized torque of the engine torque and the motor torque serving as a drive torque or a brake torque is reduced smaller than a resistance torque derived from a sliding resistance.

At point t2, the target input speed and the output speed from the clutch device 11 reduced by the upshifting are equalized to each other, and hence the target input speed is maintained to a constant value after point t2. In the example shown in FIG. 2, the actual input speed overshoots the target input speed to the level lower than the target input speed. Therefore, the feedback control is continued even after point t2, and the actual input speed is equalized to the target speed at point t3.

As described, the actual input speed to the clutch device 11 may be adjusted to the target input speed by controlling at least any one of the engine torque and the motor torque. In other words, the actual input speed to the clutch device 11 may be adjusted to the target input speed by controlling the torque of at least any one of the torque devices applied to the output shaft 6.

As also described, the response of the engine torque becomes faster with an increase in the engine speed. That is, the response of the engine torque becomes faster than the response of the motor torque depending on the engine speed. Therefore, the control system according to the embodiment of the present disclosure is configured to: select the torque device whose response is faster depending on an operating condition; set a feedback torque of the selected one of torque devices; and thereafter set a feedback torque of the other one of the torque devices to achieve a required feedback torque.

Figure 3:
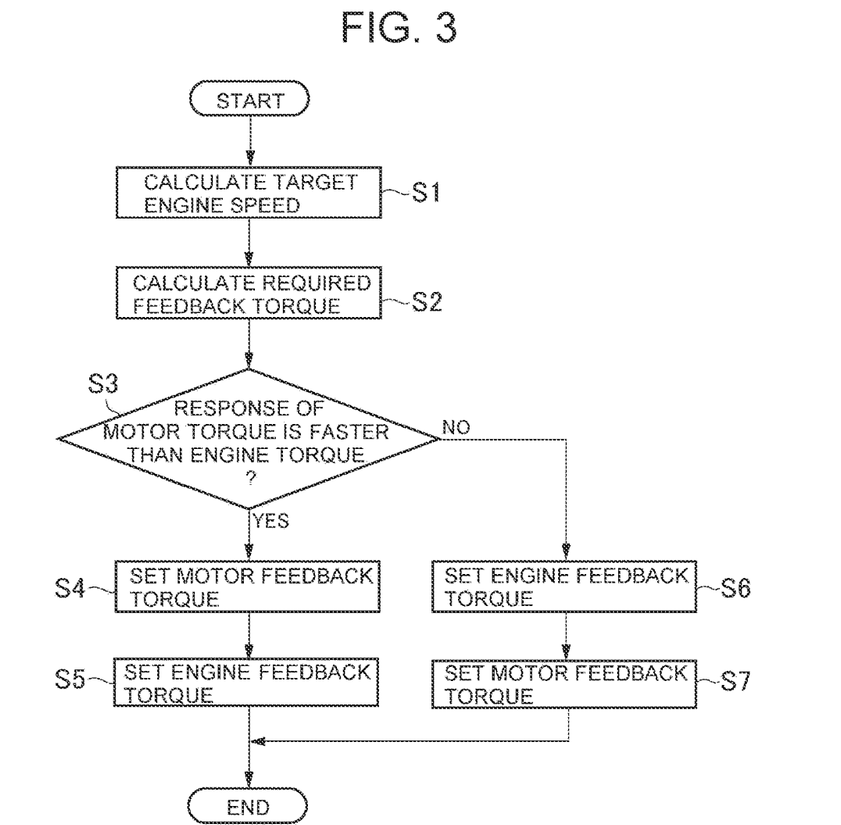
FIG. 3 is a flowchart showing one example of a routine to select a torque device to generate a feedback torque depending on a torque response.

Turning to FIG. 3, there is shown one example of a routine executed by the ECU 21 to set the engine torque and the motor torque during a transient state of a speed change operation. At step S1, a target engine speed is calculated. For example, at step S1, a change rate of the engine speed at which a driver will not feel uncomfortable feeling due to change in an engine noise resulting from an abrupt change in the engine speed, given that the input speed is synchronized with the output speed while disengaging the clutch device 11 to execute a speed change operation. Then, the target engine speed in the current routine is calculated based on the calculated change rate of the engine speed and an elapsed time from a point at which the input speed has started to change.

Then, a required feedback torque is calculated at step S2 based on the target engine speed and an actual engine speed. Specifically, the required feedback torque calculated at step S2 is an amount of change in the synthesized torque of the engine torque and the motor torque applied to the output shaft 6 to reduce a difference between the actual engine speed and the target engine speed. For example, the required feedback torque may be calculated by: calculating a difference between the target engine speed and the actual engine speed; dividing the difference between the target engine speed and the actual engine speed by an allowed time to reduce the difference between the target engine speed and the actual engine speed; and multiplying the divided value by a total inertia moment of the rotary members rotated integrally with the engine 1 and the rear motor 2.

Then, it is determined at step S3 whether the response of the motor torque is faster than the response of the engine torque. The response of the motor torque is governed by the characteristics of the rear motor 2 and the inverter 7 connected to the rear motor 2. Specifically, in order to prevent an excessive temperature rise in the inverter 7, the change rate of the motor torque is restricted, and the response of the motor torque is governed by the change rate of the motor torque. On the other hand, an ignition of the engine 1 occurs periodically in accordance with a crank angle. Therefore, the response of the engine torque becomes faster with an increase in the engine speed. That is, in a case that the engine speed is relatively low, the response of the motor torque is faster than the response of the engine torque. In this case, therefore, the answer of step S3 will be YES. By contrast, in a case that the engine speed is relatively high, the response of the engine torque is faster than the response of the motor torque. In this case, therefore, the answer of step S3 will be NO. Accordingly, such determination at step S3 may be made based on a fact that the engine speed is lower than a predetermined level. According to the embodiment of the present disclosure, definition of the "response" of the torque is a period of time from a point at which a torque command is transmitted from the ECU 21 to a point at which the torque device generates the torque in response to a reception of the torque command.

If the response of the motor torque is faster than the response of the engine torque so that the answer of step S3 is YES, the routine progresses to step S4 to set an amount of change in the motor torque required to change the actual engine speed to the target engine speed (as will be called the "motor feedback torque" hereinafter) within a range less than a limit torque of the rear motor 2. That is, the feedback control to change the motor torque is executed preferentially.

In a case that the required feedback torque may not be achieved by the motor feedback torque in spite of the preferential execution of the feedback control to change the motor torque, a deficiency with respect to the required feedback torque is generated by the engine 1. In this case, the routine progresses to step S5 to calculate a required amount of change in the engine torque to achieve the required feedback torque (as will be called the "engine feedback torque" hereinafter), and thereafter the routine returns. Specifically, the engine feedback torque is calculated by subtracting the motor feedback torque from the required feedback torque. In a case that the required feedback torque may be achieved only by the motor feedback torque set at step S4, the engine feedback torque calculated at step S5 is zero. In this case, therefore, the actual engine speed is changed to the target engine speed by changing only the motor torque.

By contrast, If the response of the engine torque is faster than the response of the motor torque so that the answer of step S3 is NO, the routine progresses to step S6 to execute the feedback control to change the engine torque preferentially. To this end, specifically, the engine feedback torque to change the actual engine speed to the target engine speed is set at step S6.

Here, a period of time possible to change the ignition timing of the engine 1 is limited. Therefore, in a case that the required feedback torque may not be achieved by the engine feedback torque in spite of the preferential execution of the feedback control to change the engine torque, a deficiency with respect to the required feedback torque is generated by the rear motor 2. In this case, the routine progresses to step S7 to calculate the motor feedback torque to achieve the required feedback torque, and thereafter the routine returns. Specifically, the motor feedback torque is calculated by subtracting the engine feedback torque from the required feedback torque.

As described, the engine torque may be changed by controlling an ignition timing, a fuel injection, or an air intake. Especially, a change rate of the engine torque is changed in accordance with the engine speed by controlling the ignition timing or the air intake. Therefore, for example, the engine feedback torque may be set at step S6 to a maximum amount of change in the engine torque by changing the ignition timing. In this case, if the required feedback torque cannot be achieved by changing the engine torque in the maximum amount only by changing the ignition timing, the engine feedback torque is set to a value calculated by adding a maximum amount of change in the engine torque by changing the fuel injection to the maximum amount of change in the engine torque by changing the ignition timing. Nonetheless, if the required feedback torque cannot be achieved by the engine feedback torque thus calculated, the routine progresses to step S7 to calculate the motor feedback torque to achieve the required feedback torque. Thus, the torque device whose response is faster is selected to set the feedback torque preferentially, and a way of changing the torque of selected torque device may also be selected.

Figure 4A:
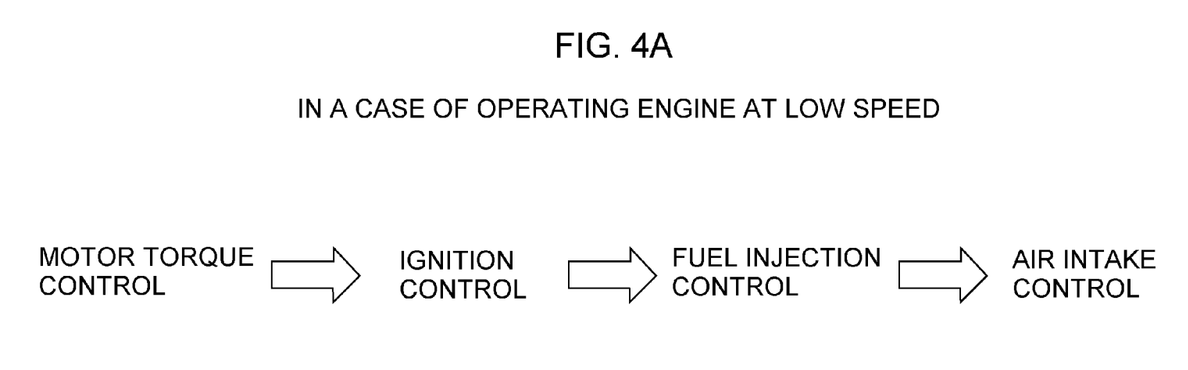
FIG. 4A is a conceptual diagram showing an order of control responses in a case that the engine speed is low.
Figure 4B:
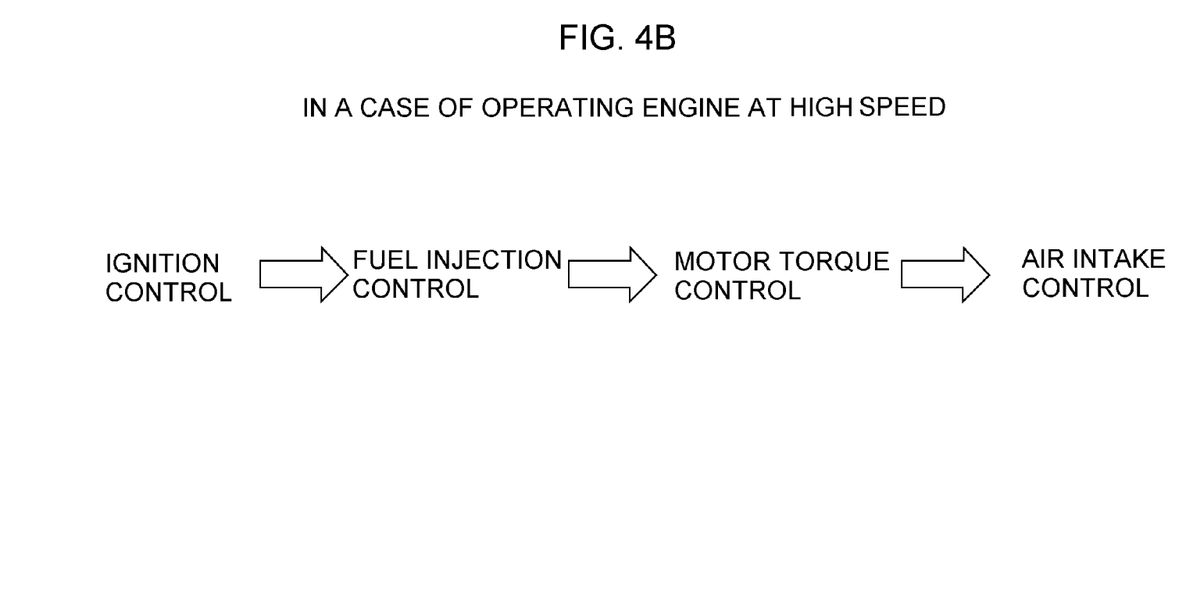
FIG. 4B is a conceptual diagram showing an order of control responses in a case that the engine speed is high.

FIG. 4A shows an order of a response to change an input torque to the clutch device 11 when the engine 1 is operated at a low speed. As can be seen from FIG. 4A, in the case that the engine 1 is operated at a low speed, a response to change the input torque to the clutch device 11 by controlling the motor torque is fastest. In this case, the response to change the input torque to the clutch device 11 becomes slower in order of controlling the ignition timing of the engine 1, the fuel injection to the engine 1, and the air intake to the engine 1. On the other hand, FIG. 4B shows an order of a response to change the input torque to the clutch device 11 when the engine 1 is operated at a high speed speed. As can be seen from FIG. 4B, in the case that the engine 1 is operated at a high speed, a response to change the input torque to the clutch device 11 by controlling the ignition timing of the engine 1 is fastest. In this case, the response to change the input torque to the clutch device 11 becomes slower in order of controlling the fuel injection to the engine 1, the motor torque, and the air intake to the engine 1. That is, in the case that the engine 1 is operated at a high speed, the response to change the input torque to the clutch device 11 by controlling the ignition timing or fuel injection becomes faster than the response to change the input torque to the clutch device 11 by controlling the motor torque. Therefore, the engine feedback torque and the motor feedback torque may be set by adding the maximum amounts of change in the torque by controlling those factors in the orders shown in FIG. 4A or FIG. 4B. Here, there may be a situation in which it is not preferable to change the fuel injection depending on e.g., a temperature of a catalyst converter (not shown) for purifying NOx contained in the exhaust gas emitted from the engine 1.

Thus, according to the embodiment of the present disclosure, one of the engine 1 and the rear motor 2 whose response to change the torque is faster is selected to set the feedback torque thereof on a preferential basis. Specifically, the response to change the torque is determined based on an operating condition of the torque device such as the engine speed. Therefore, the torque of the torque device that is suitable to generate the feedback torque may be controlled on a preferential basis. Since the torque applied to the output shaft 6 is changed by generating the feedback torque by the torque device whose response to change the torque is faster in accordance with the engine speed that changes continuously, the feedback torque may be generated promptly to reduce the difference between the target engine speed and the actual engine speed. In addition, if the required feedback torque cannot be achieved by generating only the feedback torque of the selected torque device, a deficiency in the feedback torque with respect to the required feedback torque will be generated by the other one of torque devices. Therefore, the required feedback torque may be achieved certainly and promptly.

According to the foregoing example, the feedback torque of one of the torque devices whose response to change the torque is faster is set preferentially, and a deficiency with respect to the required feedback torque is generated by the other one of the torque devices. However, if the torque device whose response to change the torque is faster has already been changed almost to the upper limit torque before increased by the feedback torque, the torque of the torque device may not be changed in accordance with a change in the required feedback torque. In this situation, the motor torque and the engine torque whose responses are different have to be controlled cooperatively, therefore, the control of those torques may become difficult.

For example, in a case of retarding the ignition timing, a temperature of the exhaust gas will be raised. In this case, therefore, an amount of retarding the ignition timing will be restricted if the engine 1 is required to generate a relatively large torque. That is, an amount of reduction in the engine torque will be restricted. On the other hand, the output torque of the rear motor 2 is restricted depending on e.g., an SOC level of the electric storage device 9, temperatures of the electric storage device 9 and the inverter 7. Therefore, if the rear motor 2 is required to generate a relatively large torque, an amount of change in the motor torque will also be restricted. That is, magnitudes of the feedback torques possible to be generated by the engine 1 and the rear motor 2 may vary depending on the operating conditions of the engine 1 and the rear motor 2 before generating the feedback torques.

Figure 5:
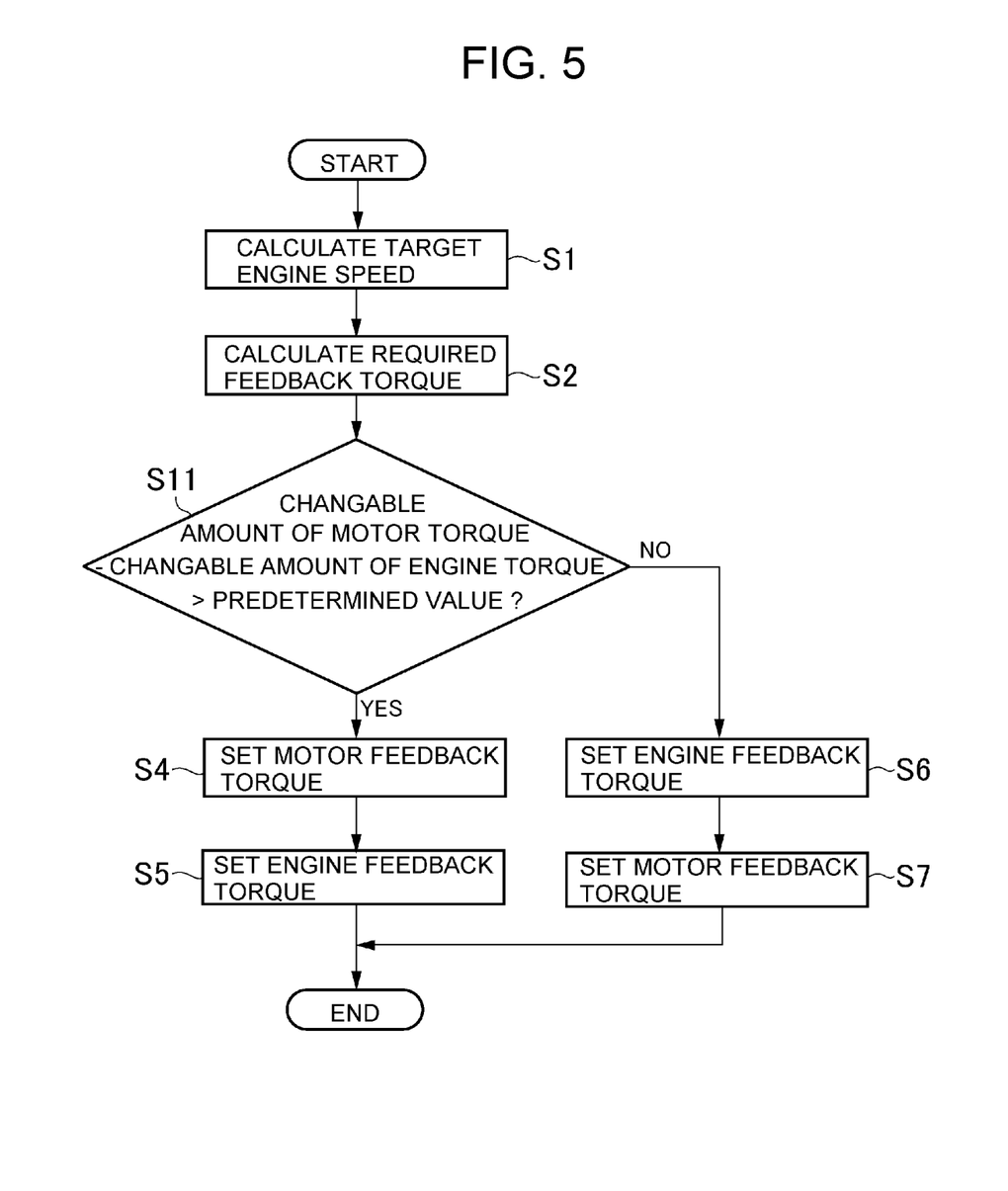
FIG. 5 is a flowchart showing another example of the routine to select the torque device to generate the feedback torque depending on an available output torque.

Therefore, according to the embodiment of the present disclosure, the control system is further configured to select one of the torque devices a current changeable amount of the output torque thereof is greater, so as to set the feedback torque preferentially. In this case, a deficiency with respect to the required feedback torque may also be generated by the other one of the torque devices. Turning to FIG. 5, there is shown another example of the routine executed by the ECU 21 to select one of the torque devices a current changeable amount of the output torque thereof is greater to set the feedback torque on a preferential basis. In the following descriptions, explanations for the steps in common with those of the routine shown in FIG. 3 will be simplified.

According to the routine shown in FIG. 5, after calculating the required feedback torque at step S2, it is determined at step S11 whether a difference between a current changeable amount of the output torque of the rear motor 2 and a current changeable amount of the output torque of the engine 1 is greater than a predetermined value. As described, the changeable amounts of the output torques of the engine 1 and the rear motor 2 may be obtained based on the operating conditions of the engine 1 and the rear motor 2. For example, the predetermined value as a threshold value employed at step S11 may be set to zero.

If the difference between the current changeable amount of the output torque of the rear motor 2 and the current changeable amount of the output torque of the engine 1 is greater than the predetermined value so that the answer of step S11 is YES, the routine progresses to step S4. By contrast, if the difference between the current changeable amount of the output torque of the rear motor 2 and the current changeable amount of the output torque of the engine 1 is equal to or less than the predetermined value so that the answer of step S11 is NO, the routine progresses to step S6.

Thus, after selecting one of the torque devices the current changeable amount of the output torque thereof is greater, the feedback torque of the selected torque device is set. As described, the current changeable amounts of the output torques of the torque devices are determined based on the operating conditions such as the engine torque and the motor torque before generating the feedback torques. By thus setting the feedback torque of the torque device the current changeable amount of the output torque thereof is greater prior to setting the feedback torque of the other torque device, a difference between the torque to which the feedback torque is added and the upper limit torque will not be reduced. In addition, if the feedback torque of the torque device the changeable amount of the output torque thereof is greater is greater than the required feedback torque, it is not necessary to control the feedback torques of both of the torque devices cooperatively. Therefore, the feedback control may be simplified.

Given that a friction clutch is adopted as the clutch device 11, a torque transmitting capacity of the clutch device 11 is controlled to apply torque to the output shaft 6 such that the input speed to the clutch device 11 is synchronized with the output speed from the clutch device 11. For example, the vehicle Ve may be launched by so-called the "flex start" by engaging the clutch device 11 while maintaining the engine speed to a high speed. When launching the vehicle Ve by the flex start, the engine speed will not be raised equal to or higher than a predetermined level by applying a brake torque to the output shaft 6 while causing the clutch device 11 to slip. Thus, the torque may also be applied to the output shaft 6 as the predetermined rotary member of the embodiment of the present disclosure by the clutch device 11. According to the embodiment of the present disclosure, therefore, the torque device further includes the clutch device 11.

In the above-mentioned situation, if the engine torque and the motor torque are controlled in such a manner as to maintain the engine speed to a predetermined level, the engine torque or the motor torque has to be restricted and hence a power to launch the vehicle Ve may not be ensured sufficiently. In order to avoid such disadvantage, the control system according to the embodiment of the present disclosure is further configured to execute the feedback control to adjust the engine speed to the target speed by controlling a torque transmitting capacity of the clutch device 11, when the engine 1 or the rear motor 2 generates power equal to or greater than a predetermined value while disengaging the clutch device 11.

Figure 6:
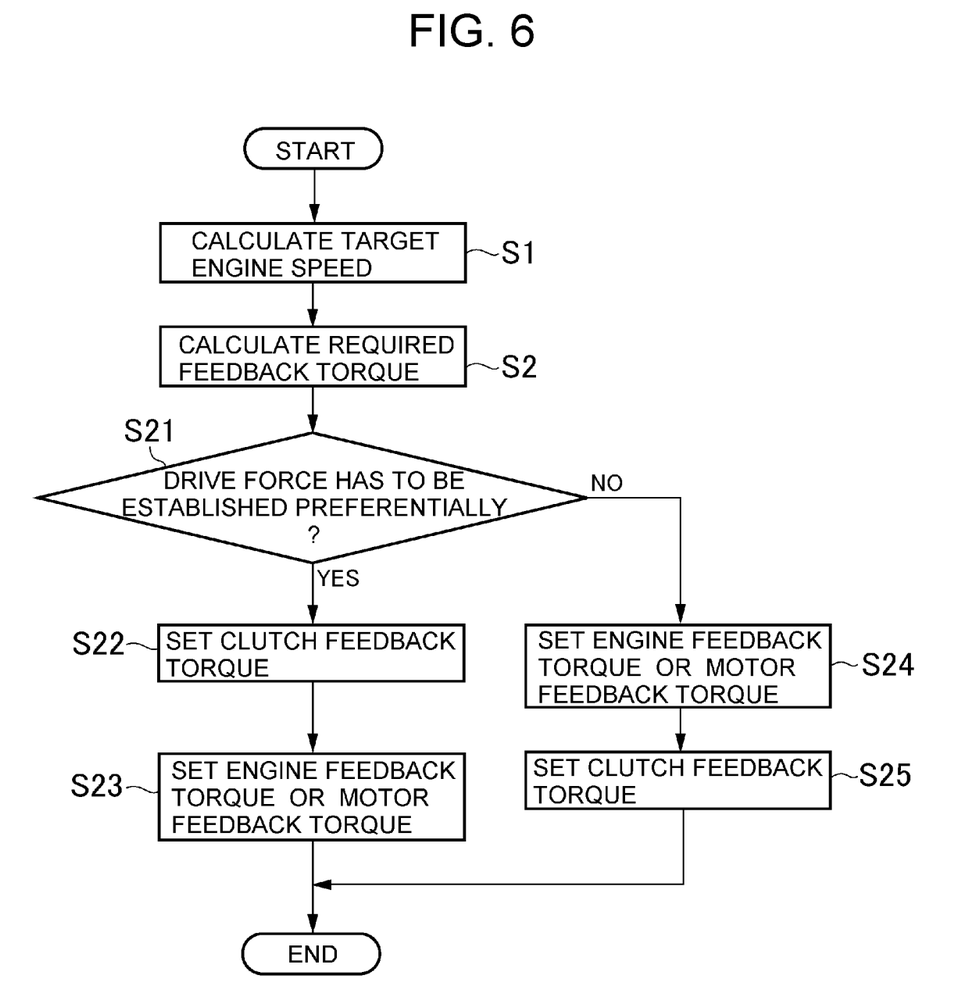
FIG. 6 is a flowchart showing still another example of the routine to select the torque device to generate the feedback torque depending on whether a drive force has to be established preferentially.

To this end, the control system executes a routine shown in FIG. 6. In the following descriptions, explanations for the steps in common with those of the routine shown in FIG. 3 will be omitted. According to the routine shown in FIG. 6, at step S21, it is determined whether it is necessary to establish a drive force preferentially. In other words, it is determined at step S21 whether it is necessary to maintain the powers generated by the engine 1 and the rear motor 2 to a predetermined value, respectively. For example, the drive force has to be established preferentially when an execution flag of the flex start or a launch control is turned on, therefore, the answer of step S21 will be YES in this case. By contrast, if another control(s) is/are in execution and hence the execution flag of the flex start or the launch control is turned off, the answer of step S21 will be NO. That is, it is determined at step S21 whether the engine 1 and the rear motor 2 are in condition to generate relatively large powers.

If the drive force has to be established preferentially so that the answer of step S21 is YES, the routine progresses to step S22 to set a torque transmitting capacity of the clutch device 11 required to change the actual engine speed to the target engine speed (as will be called the "clutch feedback torque" hereinafter) within a range less than a limit torque of the clutch device 11 set taking account of durability of the clutch device 11. That is, the feedback control to change the torque transmitting capacity of the clutch device 11 is executed preferentially.

In a case that the required feedback torque may not be achieved by the clutch feedback torque in spite of the preferential execution of the feedback control to change the torque transmitting capacity of the clutch device 11, a deficiency with respect to the required feedback torque is generated by the engine 1 or the rear motor 2. In this case, the routine progresses to step S22 to calculate the engine feedback torque or the motor feedback torque, and thereafter the routine returns. Specifically, the engine feedback torque or the motor feedback torque is calculated by subtracting the clutch feedback torque from the required feedback torque. In a case that the required feedback torque may be achieved only by the clutch feedback torque set at step S22, the engine feedback torque or the motor feedback torque calculated at step S23 is zero. In this case, therefore, the actual engine speed is changed to the target engine speed by changing only the torque transmitting capacity of the clutch device 11. At step S23, for example, any one of the engine feedback torque and the motor feedback torque is calculated by the procedure explained with reference to FIGS. 3 and 5, and if the required feedback torque cannot be achieved by one of the engine feedback torque and the motor feedback torque, other one of the engine feedback torque and the motor feedback torque is calculated.

By contrast, if the drive force does not have to be established preferentially so that the answer of step S21 is NO, the routine progresses to step S24 to execute the feedback control to change the engine torque or the motor preferentially. To this end, specifically, the engine feedback torque or the motor feedback torque to change the actual engine speed to the target engine speed is set at step S24.

In a case that the required feedback torque may not be achieved by the engine feedback torque or the motor feedback torque in spite of the preferential execution of the feedback control to change the engine feedback torque or the motor feedback torque, a deficiency with respect to the required feedback torque is generated by controlling the torque transmitting capacity of the clutch device 11 to apply the brake torque to the output shaft 6. In this case, the routine progresses to step S25 to calculate the clutch feedback torque, and thereafter the routine returns. Specifically, the clutch feedback torque is calculated by subtracting the engine feedback torque or the motor feedback torque from the required feedback torque. In this case, the engine feedback torque and the motor feedback torque may be selected and calculated at step S24 by the same procedures as step S23.

Thus, when it is necessary to establish the drive force preferentially, the clutch device 11 is selected as the torque device, and the feedback torque of the clutch device is set prior to setting the feedback torque of the engine 1 or the rear motor 2. Therefore, the output torques of the engine 1 and the rear motor 2 will not be reduced to control the rotational speed of the output shaft 6. That is, the engine 1 and the rear motor 2 are allowed to generate a large power, respectively. For this reason, the drive force can be ensured certainly to launch the vehicle Ve by the flex start or to execute the launch control.

Although the above exemplary embodiment of the present disclosure has been described, it will be understood by those skilled in the art that the present disclosure should not be limited to the described exemplary embodiments, and various changes and modifications can be made within the scope of the present disclosure. That is, the control system according to the embodiment of the present disclosure may also be applied to any kind of vehicles in which torques can be applied to a rotary member to be controlled from a plurality of devices. For example, in a vehicle in which the engine and the motor are connected to an output member through a differential mechanism while being allowed to rotate differentially, an engine speed may be controlled by controlling torques of the engine and the motor. Therefore, given that the control system according to the embodiment of the present disclosure is applied to the vehicle of this kind, a rotational speed of an output shaft of the engine may be controlled by generating a feedback torque by any one of the engine and the motor depending on operating conditions of the engine and the motor.

In addition, the control system according to the embodiment of the present disclosure may be applied not only to the hybrid vehicle in which the prime mover included the engine and the motor, but also to a vehicle comprising an engine or a motor serving as a prime mover, a rotary member to which torque is applied to the prime mover, and an engagement device that applies the torque to the rotary member.

What is claimed is:

1. A control system for a vehicle having at least two torque devices each of which applies a torque to a predetermined rotary member, comprising:
   a controller that controls a synthesized torque of the torques generated by the torque devices to adjust a speed of the predetermined rotary member to a target speed,
   wherein the controller is configured to calculate a target amount of change in the synthesized torque required to reduce a difference between an actual speed and the target speed of the predetermined rotary member, calculate an amount of change in the torque applied to the predetermined rotary member by one of the torque devices, in accordance with operating conditions of the torque devices when reducing the difference between the actual speed and the target speed of the predetermined rotary member, and calculate an amount of change in the torque applied to the predetermined rotary member by another one of the torque devices, based on the target amount of change in the synthesized torque and the amount of change in the torque applied to the predetermined rotary member by said one of the torque devices, wherein the vehicle further comprises an engine and a motor connected to the predetermined rotary member respectively to apply the torque to the predetermined rotary member, the torque devices include the engine and the motor, the controller is further configured to select the motor as said one of the torque devices and select the engine as said another one of the torque devices, if a response of the torque of the motor is faster than a response of the torque of the engine, and select the engine as said one of the torque devices and select the motor as said another one of the torque devices, if the response of the torque of the engine is faster than the response of the torque of the motor.

2. The control system for the vehicle as claimed in claim 1, wherein the controller is further configured to determine that the response of the torque of the motor is faster than the response of the torque of the engine if a speed of the engine is lower than a predetermined level, and determine that the response of the torque of the engine is faster than the response of the torque of the motor if the speed of the engine is equal to or higher than the predetermined level.

3. The control system for the vehicle as claimed in claim 1, wherein the controller is further configured to control an ignition timing of the engine to ignite an air/fuel mixture supplied to the engine in accordance with a rotational angle of an output shaft of the engine, and change the torque applied to the predetermined rotary member by changing the ignition timing of the engine from a predetermined timing.

4. The control system for the vehicle as claimed in claim 2, wherein the controller is further configured to control an ignition timing of the engine to ignite an air/fuel mixture supplied to the engine in accordance with a rotational angle of an output shaft of the engine, and change the torque applied to the predetermined rotary member by changing the ignition timing of the engine from a predetermined timing.

5. The control system for the vehicle as claimed in claim 1, wherein the controller is further configured to supply a fuel to the engine in accordance with a rotational angle of an output shaft of the engine, and change the torque applied to the predetermined rotary member in accordance with an amount of fuel supply to the engine.

6. The control system for the vehicle as claimed in claim 2, wherein the controller is further configured to supply a fuel to the engine in accordance with a rotational angle of an output shaft of the engine, and change the torque applied to the predetermined rotary member in accordance with an amount of fuel supply to the engine.

7. The control system for the vehicle as claimed in claim 6, wherein the controller is further configured to supply a fuel to the engine in accordance with the rotational angle of the output shaft of the engine, and change the torque applied to the predetermined rotary member in accordance with an amount of fuel supply to the engine.

8. The control system for the vehicle as claimed in claim 4, wherein the controller is further configured to supply a fuel to the engine in accordance with the rotational angle of the output shaft of the engine, and change the torque applied to the predetermined rotary member in accordance with an amount of fuel supply to the engine.

* * * * *